(12) United States Patent
Manter

(10) Patent No.: US 6,684,314 B1
(45) Date of Patent: Jan. 27, 2004

(54) MEMORY CONTROLLER WITH PROGRAMMABLE ADDRESS CONFIGURATION

(75) Inventor: Venitha L. Manter, Fort Collins, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 466 days.

(21) Appl. No.: 09/616,286

(22) Filed: Jul. 14, 2000

(51) Int. Cl.[7] .............................................. G06F 12/00
(52) U.S. Cl. ........................ 711/200; 711/105; 711/154; 711/170; 711/217; 365/230.01; 365/189.01
(58) Field of Search ................................ 711/200, 105, 711/154, 170, 217; 365/189.01, 230.01

(56) References Cited

U.S. PATENT DOCUMENTS

| | | | |
|---|---|---|---|
| 4,282,584 A | * 8/1981 | Brown et al. ................. | 714/48 |
| 5,522,064 A | * 5/1996 | Aldereguia et al. ......... | 713/501 |
| 5,621,678 A | * 4/1997 | Barnaby et al. .............. | 365/52 |
| 5,768,560 A | * 6/1998 | Lieberman et al. ......... | 711/167 |
| 5,867,444 A | * 2/1999 | Le et al. ................. | 365/230.06 |
| 5,918,242 A | * 6/1999 | Sarma et al. .................. | 711/5 |
| 6,044,474 A | * 3/2000 | Klein .......................... | 713/400 |
| 6,334,174 B1 | * 12/2001 | Delp et al. ................. | 711/167 |
| 6,366,989 B1 | * 4/2002 | Keskar et al. .............. | 711/167 |

OTHER PUBLICATIONS

Bazes et al., "A Programmable NMOS DRAM Controller for Microcomputer Systems with Dual–Port Memory and Error Checking and Correction," pp 164–172, IEEE, 1983.*
IBM Technical Disclosure Bulletin, "Programmable Memory Controller," pp 351–354, vol. 31, Issue No. 9, 1989.*

* cited by examiner

*Primary Examiner*—Matthew Kim
*Assistant Examiner*—Stephen Elmore

(57) ABSTRACT

A memory controller comprises a programmable interface coupled to address circuitry. The programmable interface receives a configuration signal into the memory controller indicating a selected address configuration. The address circuitry processes system addresses based on the selected address configuration to generate memory addresses. The configuration signal may also indicate a selected memory configuration, and the address circuitry processes the system addresses based on the selected memory configuration to generate memory device selections.

22 Claims, 6 Drawing Sheets

MEMORY CONTROLLER WITH PROGRAMMABLE ADDRESS CONFIGURATION

BACKGROUND OF THE INVENTION

1. Field of the Invention.

The invention is related to the field of memory controllers, and in particular, to a memory controller that can be programmed with various address configurations for different memory devices.

2. Statement of the Problem

A memory controller provides a system with access to memory devices. For example, a memory controller provides the interface between a computer processor and a Dynamic Random Access Memory (DRAM). The memory controller translates control signals and addresses that pass between the system and the memory devices. Memory controllers also buffer data during data transfers between the system and the memory devices.

The memory controller uses an address configuration and a memory configuration to translate system addresses into memory addresses and memory device selections. Unfortunately, different memory devices have different address configurations, and different memory systems have different memory configurations. Thus, the memory controller must be designed to use the same address configuration and the same memory configuration as the memory devices. This requires that the specific memory devices for a memory system be selected during system design when it is difficult to predict the future availability and price of specific memory devices.

In addition, many different types of memory controllers are needed to service the many different types of memory devices. Multiple different memory controllers add complexity to memory system design. The current situation also prevents the efficient mass production of a single type of memory controller.

SUMMARY OF THE SOLUTION

The invention solves the above problems with a memory controller that uses a programmable address configuration and memory configuration to convert system addresses into memory addresses and memory device selections. Advantageously, the memory controller does not need to be designed specifically for a given memory device or system because the memory controller can be subsequently programmed with the address configuration of the selected memory devices and with the memory configuration of the selected memory system. Address configuration and memory configuration programming occurs after the memory controller is designed and is manufactured.

The memory controller comprises a programmable interface coupled to address circuitry. The programmable interface is configured to receive configuration signals into the memory controller indicating a selected address configuration. The address circuitry is configured to process system addresses based on the selected address configuration to generate memory addresses. In some examples of the invention, the configuration signals also indicate a selected memory configuration, and the address circuitry is configured to process the system addresses based on the selected memory configuration to generate memory device selections.

DETAILED DESCRIPTION OF THE INVENTION

Memory Controller—FIGS. 1–4

FIGS. 1–4 depict a specific example of a memory controller and system in accord with the present invention. Those skilled in the art will appreciate numerous variations from this example that do not depart from the scope of the invention. Those skilled in the art will also appreciate that various features described below could be combined with other embodiments to form multiple variations of the invention.

Figure 1:
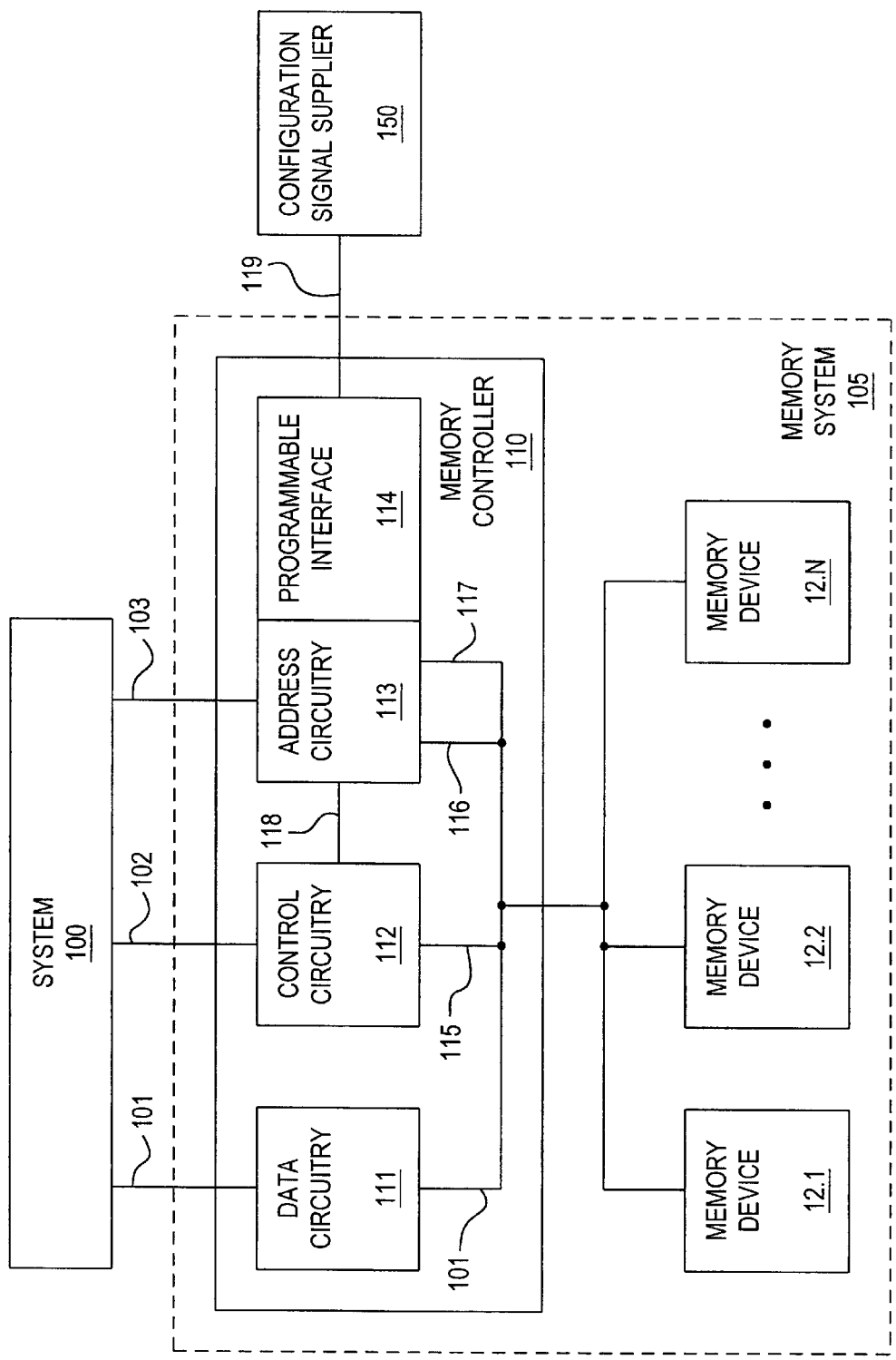
FIG. 1 is a block diagram that illustrates a memory controller in an example of the invention.

FIG. 1 is a block diagram that illustrates memory controller 110 in an example of the invention. Memory system 105 comprises the memory controller 110 and memory devices 12.1, 12.2, ... 12.N that are coupled together in a conventional manner. Memory controller 110 comprises data circuitry 111, control circuitry 112, address circuitry 113, and programmable interface 114. Memory controller 110 exchanges data along a communication link 101 between a system 100 and memory devices 12.1, 12.2, ... 12.N. Those skilled in the art will appreciate that some conventional aspects of memory system 105 and memory controller 110 have been simplified or omitted for clarity.

To write data, system 100 transfers data along the communication link 101, system control signals along a communication link 102, and a system address along a communication link 103 to memory controller 110. System control signals indicate the write operation. The system address indicates the desired location within memory devices 12.1, 12.2, ... 12.N in which to write data.

Control circuitry 112 receives system control signals, and in response, generates memory control signals on a communication link 115. Control circuitry 112 transfers memory control signals along the communication link 115 to memory devices 12.1, 12.2, ... 12.N. Address circuitry 113 receives system address, and in response, generates a memory address along a communication link 116 and memory device selection signals along a communication link 117 according to settings in programmable interface 114. Address circuitry 113 transfers memory address along communication link 116 and memory device selection signals along communication link 117 to memory devices 12.1, 12.2, ... 12.N. Data circuitry 111 receives data from system 100 and transfers the data to memory devices 12.1, 12.2, ... 12.N.

Memory control signals on communication link 115 indicate the write operation. Memory address on communication link 116 indicates the desired location for data within a selected one of the memory devices 12.1, 12.2, ... 12.N. Memory device selection signals on communication link 117 indicate the selected one of memory devices 12.1, 12.2, ... 12.N in which to write data. Memory devices 12.1, 12.2, ... 12.N write data to internal memory in response to memory control signals on communication link 115, memory address on communication link 116, and memory device selection signals on communication link 117.

To read data, system 100 transfers system control signals along communication link 102 and system address along communication link 103 to memory controller 110. System control signals now indicate the read operation. System address indicates the location within memory devices 12.1, 12.2, ... 12.N from which data is read. Control circuitry 112 receives system control signals on communication link 102, and in response, generates memory control signals along communication link 115. Control circuitry 112 transfers memory control signals to memory devices 12.1, 12.2, ... 12.N. Address circuitry 113 receives system address on communication link 103, and in response, generates memory address along communication link 116 and memory device selection signals along communication link 117 according to settings in programmable interface 114. Address circuitry 113 transfers memory address and memory device selection signals to memory devices 12.1, 12.2, . . . 12.N. Data circuitry 111 receives data from the memory address of the selected memory device 12.1, 12.2, . . . 12.N and transfers the data to system 100.

Memory control signals on communication link 115 indicate the read operation. Memory address on communication link 116 indicates the location of data within the selected one of the memory devices 12.1, 12.2, . . . 12.N. Memory device selection signals on communication link 117 indicate the selected one of the memory devices 12.1, 12.2, . . . 12.N from which data is read. Memory devices 12.1, 12.2, . . . 12.N read data from internal memory in response to memory control signals on communication link 115, memory address on communication link 116, and memory device selection signals on communication link 117.

The addresses for memory devices 12.1, 12.2, . . . 12.N have a format that is referred to as an address configuration. Thus, memory controller 110 converts system address on communication link 103 into memory address along communication link 116 based on the address configuration of memory devices 12.1, 12.2, . . . 12.N. In a distinct advance in the art, memory controller I 10 uses a programmable address configuration for this conversion. Advantageously, memory controller 110 does not need to be designed specifically for memory devices 12.1, 12.2, . . . 12.N because memory controller 110 can be subsequently programmed with the address configuration for whichever types of memory devices 12.1, 12.2, . . . 12.N that are incorporated into the memory system 105. Address configuration programming may occur after memory controller 110 is designed and manufactured, and after memory devices 12.1, 12.2, . . . 12.N are selected.

A memory configuration is used to select a memory device when multiple memory devices 12.1, 12.2, . . . 12.N are connected to memory controller 110. Memory controller converts system address on communication link 103 into memory device selection signals along communication link 117 based on the memory configuration of memory devices 12.1, 12.2, . . . 12.N and a conventional device select control signal along communication link 118. In a distinct advance in the art, memory controller 110 uses a programmable memory configuration for this conversion. Advantageously, memory controller 110 does not need to be created specifically for memory devices 12.1, 12.2, . . . 12.N because memory controller 110 can be subsequently programmed with the memory configuration for memory devices 12.1, 12.2, . . . 12.N. Memory configuration programming may occur after memory controller 110 is designed and after memory devices 12.1, 12.2, . . . 12.N are selected.

To program memory controller 110, programmable interface 114 receives a configuration signal along communication link 119 from a configuration signal supplier 150. The configuration signal supplier 150 may be a register that stores the configuration signal, or connections to pins of the chip tied high or low, or other suitable means for holding a preset configuration signal. The configuration signal supplier 150 indicates the selected address configuration and memory configuration for memory devices 12.1, 12.2, . . . 12.N. Address circuitry 113 is coupled to programmable interface 114. Address circuitry 113 processes the system address from communication link 103 based on the selected address configuration to generate memory address on communication link 116. Address circuitry 113 also processes system address from communication link 103 and control signal from communication link 118 based on the selected memory configuration to generate memory device selection signals along communication link 117.

Figure 2:
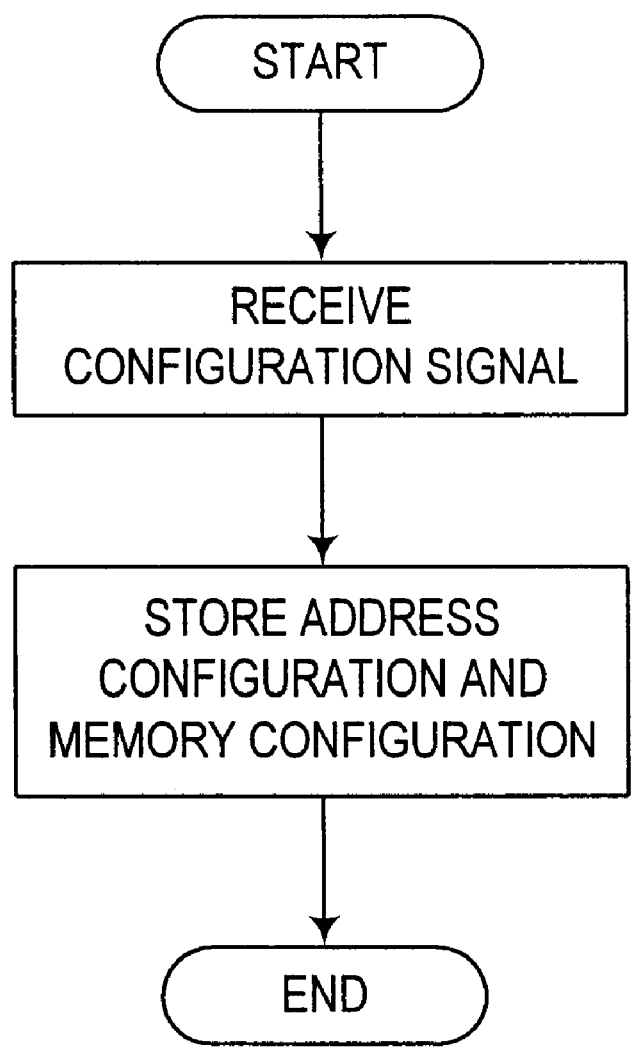
FIG. 2 is a flow diagram that illustrates memory controller operation in an example of the invention.

FIG. 2 is a flow diagram that illustrates the operation of the memory controller 110 configuration in an example of the invention. For initial configuration, memory controller 110 receives and stores a configuration signal indicating a selected address configuration and a selected memory configuration.

Figure 3:
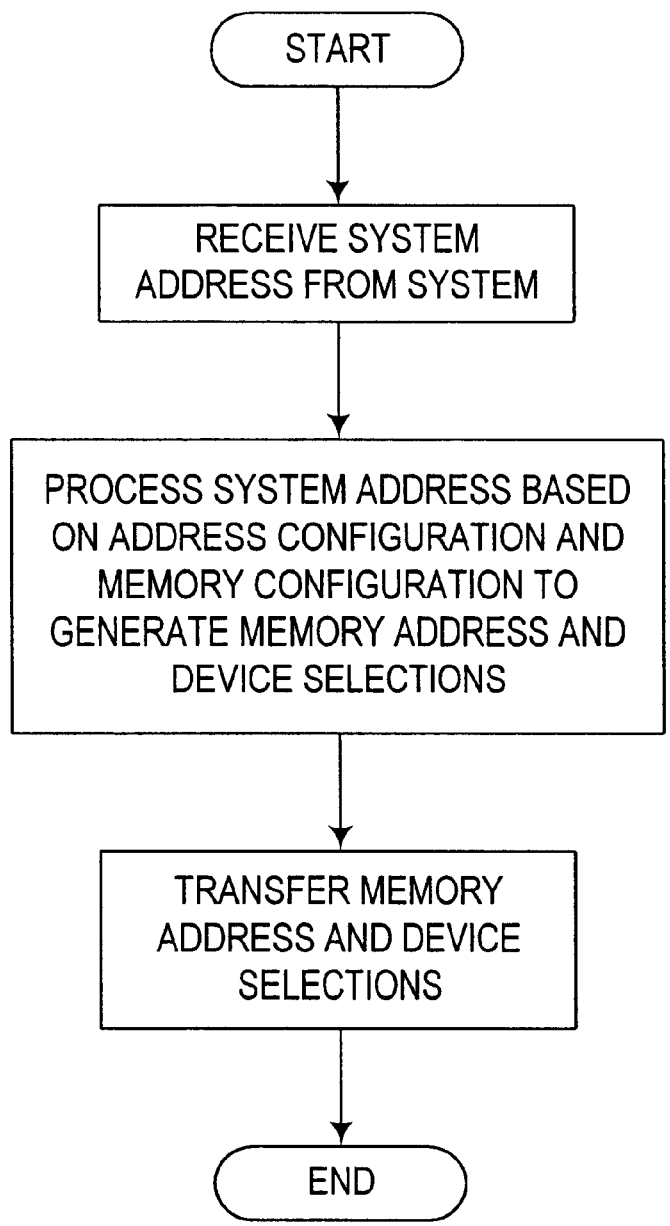
FIG. 3 is a flow diagram that illustrates memory controller operation in an example of the invention.

FIG. 3 is a flow diagram that illustrates memory controller 110 operation in an example of the invention. Memory controller 110 receives system addresses. Memory controller 110 processes the system addresses based on the selected address configuration to generate memory addresses. Memory controller 110 processes the system addresses based on the selected memory configuration to generate memory device selections. Memory controller 110 transfers the memory addresses and the memory device selections to the memory devices.

Figure 4:
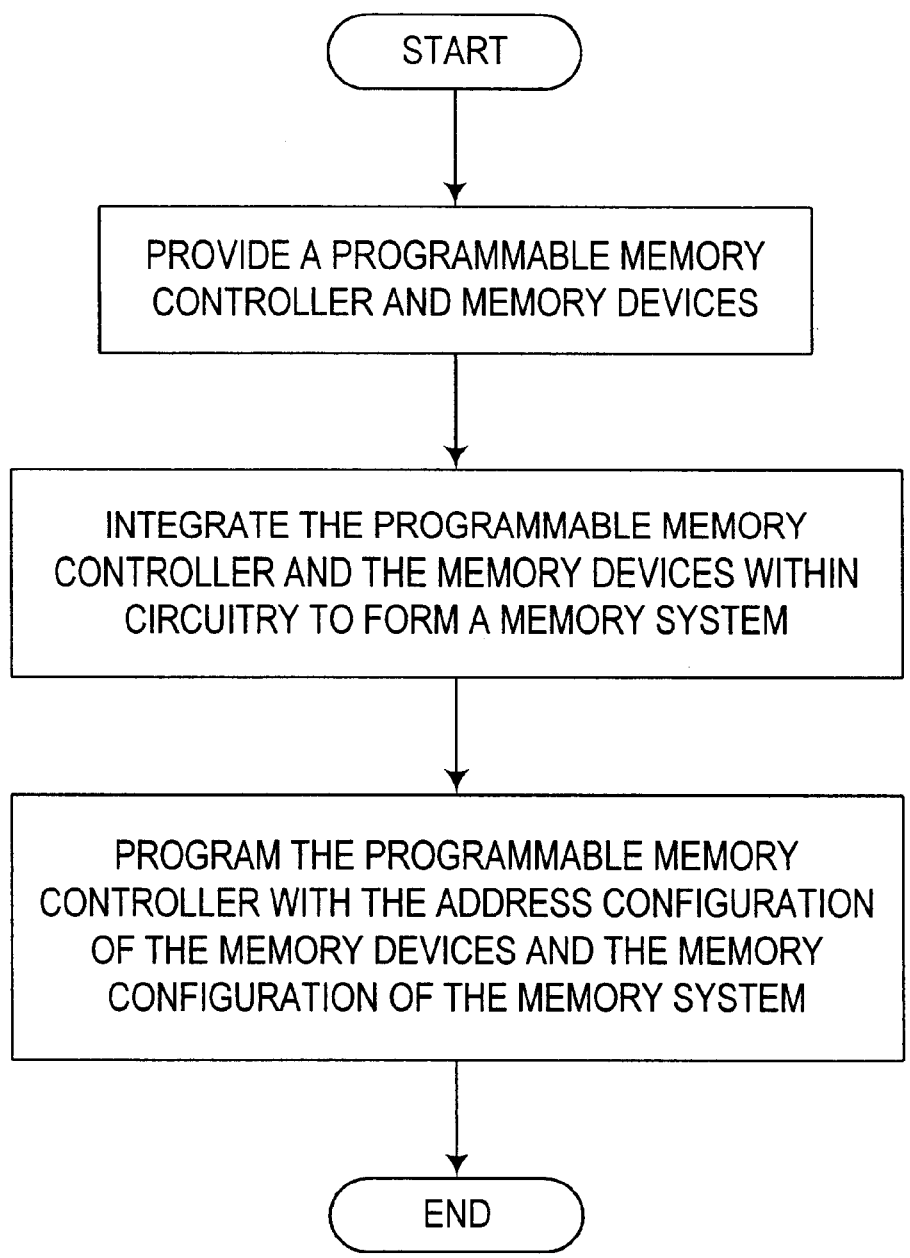
FIG. 4 is a flow diagram that illustrates memory system manufacturing in an example of the invention.

FIG. 4 is a flow diagram that illustrates memory system 105 manufacturing in an example of the invention. First, a programmable memory controller and memory devices are provided. Second, the programmable memory controller and the memory devices are integrated together within circuitry to form a memory system using any suitable manufacturing process. The programmable memory controller can be configured to process system addresses based on a particular address configuration of a received configuration signal. Based on the particular address configuration, the programmable memory controller processes the system addresses to generate memory addresses. The programmable memory controller can also process the system addresses based on a particular memory configuration of the configuration signal. Based on the memory configuration, the programmable memory controller processes the system addresses to generate memory device selections. A particular memory device uses one particular address configuration, and a particular memory system uses one particular memory configuration. Third, the programmable memory controller is programmed to use the address configuration of the memory devices and the memory configuration of the memory system.

Figure 5:
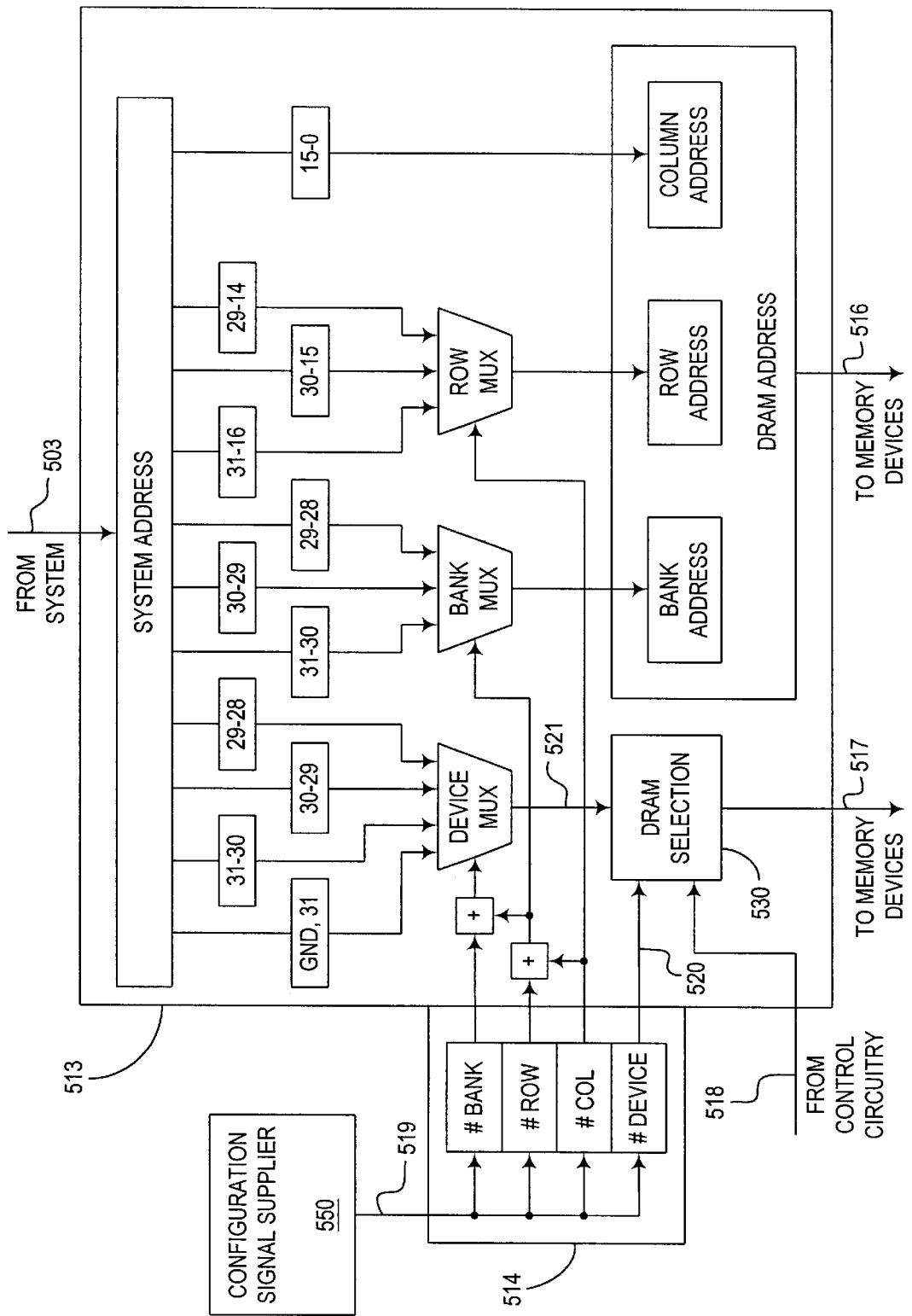
FIG. 5 is a block diagram that illustrates DRAM memory controller circuitry in an example of the invention.
Figure 6:
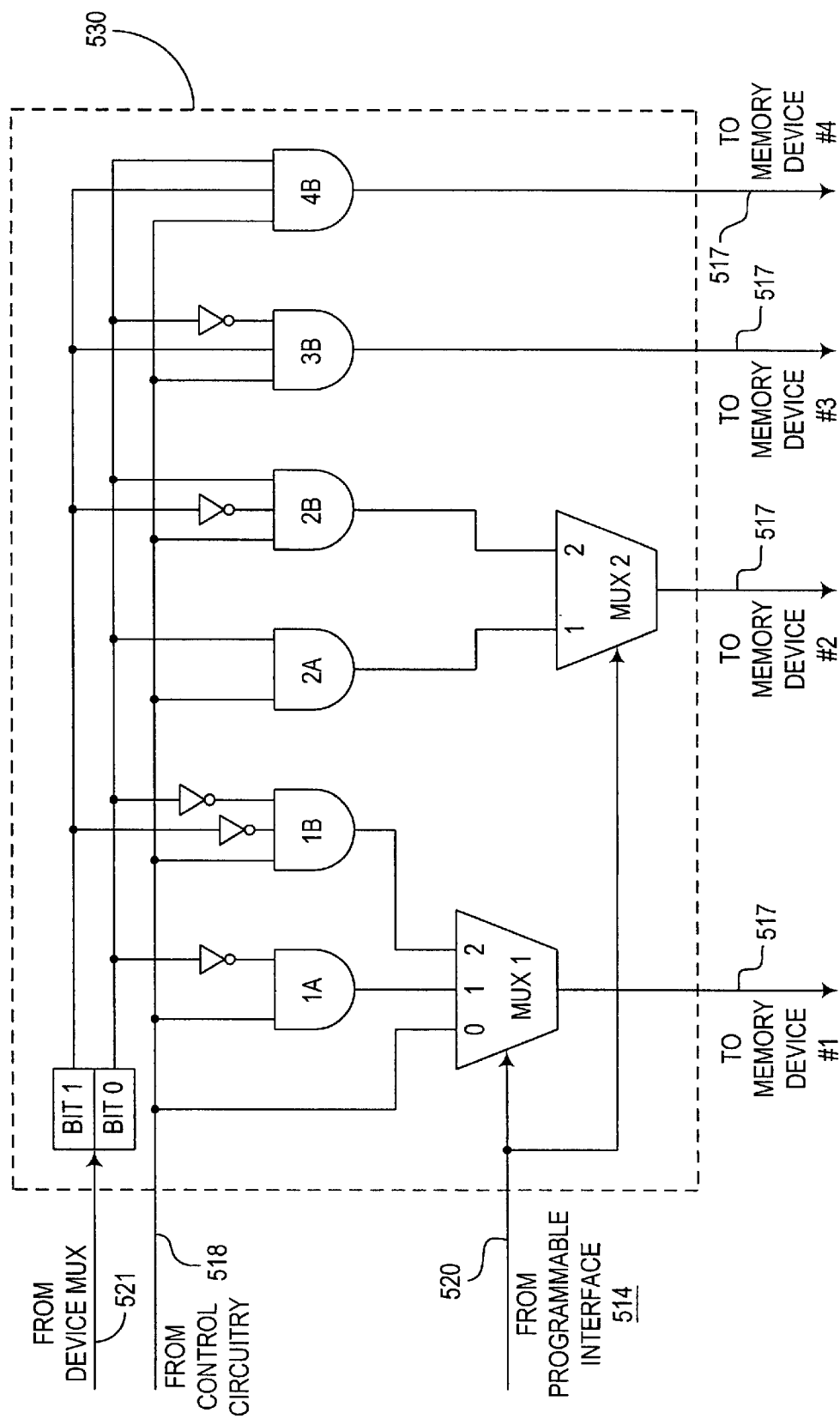
FIG. 6 is a block diagram that illustrates device selection circuitry of a DRAM memory controller in an example of the invention.

DRAM Memory Controller Circuitry—FIGS. 5–6

FIGS. 5–6 depict a specific example of circuitry for a Dynamic Random Access Memory (DRAM) controller in accord with the present invention. Those skilled in the art will appreciate numerous variations from this example that do not depart from the scope of the invention. Those skilled in the art will also appreciate that various features described below could be combined with other embodiments to form multiple variations of the invention.

A DRAM has banks of arrays that are comprised of columns and rows. The DRAM address must indicate the proper bank, row, and column for accurate read and write operations. Different DRAMs have different address configurations. For example, DRAM "A" might require 13 bits to identify a column and DRAM "B" might require 15 bits to identify a column. Thus, the DRAM controller must use the specific address configuration of the specific DRAM to function effectively.

FIG. 5 is a block diagram that illustrates address circuitry 513 and programmable interface 514 for a DRAM controller in an example of the invention. The address circuitry 513 and programmable interface 514 may be configured similarly to the address circuitry 113 and the programmable interface 114, respectively, of the memory controller 110 shown in FIG. 1. Programmable interface 514 receives configuration signal along communication link 519 from a configuration signal supplier 550. The configuration signal supplier 550 may be a register that holds the configuration signal or a number of connections to pins tied high or grounded, depending on the particular configuration signal. Address circuitry 513 receives system address along a communication link 503 from a system, such as the system 100 shown in FIG. 1, and chip selection signal 518 from central circuitry, such as control circuitry 112 also shown in FIG. 1. Chip selection signal on communication link 518 is a conventional signal in memory controller circuitry. Address circuitry 513 processes system address based on the configuration signal to generate DRAM address along a communication link 516. Address circuitry 513 also processes system address on communication link 503 based on the configuration signal and chip selection signal to generate DRAM selection signals along communication link 517.

Configuration signal indicates the address configuration for the selected DRAMs and the memory configuration for the selected memory system. The address configuration identifies the number of bits that specify the column (#COL), row (#ROW), and bank (#BANK) in the DRAM address. The memory configuration identifies the total number of address bits used in DRAM memory device selection (#DEVICE), The number of column address bits is the selection input to a row address mux. The number of column address bits is added to the number of row address bits and is the selection input to a bank address mux.

The sum of column and row address bits is added to the number of bank address bits and is the selection input to a device selection mux. The device selection mux provides resulting device address bits along communication link 521 to device selection circuitry 530. Device selection circuitry 530 combines chip selection signal on communication link 518 with device address bits on communication link 521 based on the number of device bits to produce device selection signals along communication link 517. An example of device selection circuitry 530 is described further below with respect to FIG. 6.

System address on communication link 503 is logically parsed into bit groups that form inputs to the muxes. To select the particular bit groups that will generate DRAM address along communication link 516, the row mux uses the number of column bits from configuration-signal on communication link 519, and the bank mux uses the number of column and row bits from the configuration signal. The device mux uses the number of bank, column, and row bits from the configuration signal to select the particular bit group that will generate device selection signals along communication link 517. The number and size of the bit groups can vary based on the given memory controller design goal, and FIG. 5 is only an illustrative example of one such design. In this example, each mux receives three bit groups from the system address that cover a range of address configurations for various DRAMs. All possible bit groups from the system address could be used as inputs to the muxes to provide maximum programmability, but this implementation is typically inefficient. The number of mux inputs and the number of bits in each bit group depend on the desired range of DRAM address configurations to support. To illustrate the principle further, consider the following DRAM address configurations.

| DRAM "A" ADDRESS CONFIGURATION (TOTAL BITS) | | | |
|---|---|---|---|
| COLUMN BITS (15) | ROW BITS (14) | BANK BITS (2) | DEVICE BITS |
| 14-0 | 28-15 | 30-29 | 31 |

For DRAM "A", the system address would include bits 31-0, and the configuration signal would indicate 15, 14, and 2 as the respective number of column, row, and bank bits, and I as the device bits (indicating two memory devices). Bits 14-0 from the system address become bits 14-0 of the column address in the DRAM address. Note that system address bit 15 becomes column address bit 15, but this is not a problem because the DRAM ignores column address bit 15. The row address mux uses the number of column bits (15) to select system address bits 28-15 to become bits 13-0 of the row address in the DRAM address. Note that system address bits 30-29 become row address bits 15-14, but this is not a problem because the DRAM ignores row address bits 15-14. The bank address mux uses the sum of column bits and row bits (15+14=29) to select the system address bits 30-29 to become bits 1-0 of the bank address in the DRAM address. The device selection mux uses the sum of column bits, row bits, and bank bits (15+14+2=31) to select the system address bit 31 for combination with chip selection signal on communication link 518 to provide bits 1-0 of device selection signals along communication link 517.

| DRAM "B" ADDRESS CONFIGURATION (TOTAL BITS) | | | |
|---|---|---|---|
| COLUMN BITS (21) | ROW BITS (21) | BANK BITS (3) | DEVICE BITS (3) |
| 20-0 | 41-21 | 44-42 | 47-45 |

For DRAM "B", the system address would include bits 47-0 in this address configuration, and the configuration signal would indicate 21, 21, and 3 as the respective number of column, row, and bank bits, and 3 as the device bits (indicating eight memory devices). Bits 20-0 from the system address become bits 20-0 of the column address in the DRAM address. The row address mux uses the number of column bits (21) to select system address bits 41-21 to become bits 20-0 of the row address in the DRAM address. The bank address mux uses the sum of column bits and row bits (21+21=42) to select the system address bits 44-42 to become bits 2-0 of the bank address in the DRAM address. The device selection mux uses the sum of column bits, row bits, and bank bits (21+21+3=45) to select the system address bits 47-45 for combination with chip selection signal on communication link 518 to provide bits 7-0 of device selection signals along communication link 517.

FIG. 6 is a block diagram that illustrates device selection circuitry 530 in an example of the invention. Device selection circuitry 530 combines chip selection signal on communication link 518 with device address bits on communication link 521 based on device bits on communication link 520 to produce device selection signals along communication link 517. A different one of the device selection signals 517 is provided to each of the memory devices. In this example, there could be from 1-4 memory devices, so all of the device selection signals may not be needed.

Chip selection signal on communication link 518 and device address bits on communication link 521 are provided to various AND gates. Device address bits are inverted prior to some AND gate inputs. The AND gates produce a 1 only if chip selection signal on communication link 518 is also a 1. The following table illustrates the values of device address bits 521 that are required to produce a 1 from the AND gates.

| AND GATE    | 1A | 2A | 1B | 2B | 3B | 4B |
|-------------|----|----|----|----|----|----|
| BIT1        | —  | —  | 0  | 0  | 1  | 1  |
| BIT0        | 0  | 1  | 0  | 1  | 0  | 1  |
| GATE OUTPUT | 1  | 1  | 1  | 1  | 1  | 1  |

The muxes select their respective inputs to become device selection signals based on device bits on communication link 520 which indicate the number of bits in the system address that are used for memory device selection. If device bits are zero, then there is only one memory device in the system, and chip selection signal on communication link 518 is passed directly to this memory device. If device bits are one, then there are two memory devices in the system, and outputs from AND gates 1A and 2A are respectively passed to memory devices 1 and 2. If device bits are two, then there four memory devices in the system, and outputs from AND gates 1B, 2B, 3B, and 4B are respectively passed to memory devices 1, 2, 3, and 4.

Chip selection signal on communication link 518 and device address bits on communication link 521 are manipulated to provide a 1 to the selected memory device and a 0 to the other memory devices. Device bits on communication link 520 allow a choice of selection signals output along communication link 517 based on the memory configuration being used by the memory system.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A memory controller comprising:
    a programmable interface configured to receive a configuration signal into the memory controller indicating a selected address configuration; and
    address circuitry coupled to the programmable interface and configured to process system addresses based on the selected address configuration to generate memory addresses;
    wherein the address circuitry is configured to select bit groups from the system addresses based on the selected address configuration to generate the memory addresses.

2. The memory controller of claim 1, wherein the configuration signal also indicates a selected memory configuration and the address circuitry is further configured to process the system addresses based on the selected memory configuration to generate memory device selections.

3. The memory controller of claim 1, wherein the address circuitry is further configured to receive the system addresses into the memory controller and transfer the memory addresses from the memory controller, the memory controller further comprising:
    control circuitry configured to receive system control signals into the memory controller, generate memory control signals in response to the system control signals, and transfer the memory control signals from the memory controller; and
    data circuitry configured to receive data into the memory controller and transfer the data from the memory controller.

4. The memory controller of claim 1, wherein the address circuitry is configured to generate the memory addresses for a dynamic random access memory.

5. The memory controller of claim 1, wherein the address circuitry is configured to select row address bits from the system addresses based on a number of column address bits in the selected address configuration.

6. The memory controller of claim 1, wherein the address circuitry is configured to select bank address bits from the system addresses based on a number of column address bits and a number of row address bits in the selected address configuration.

7. The memory controller of claim 1, wherein the programmable interface receives the configuration signal from outside the memory controller and the address circuitry receives the system addresses from outside the memory controller.

8. A memory controller comprising:
    a programmable interface configured to receive a configuration signal into the memory controller indicating a selected address configuration; and
    address circuitry coupled to the programmable interface and configured to process system addresses based on the selected address configuration to generate memory addresses;
    wherein the address circuitry is configured to select row address bits from the system addresses based on a number of column address bits in the selected address configuration.

9. The memory controller of claim 8, wherein the address circuitry is configured to select bank address bits from the system addresses based on the number of column address bits and a number of row address bits in the selected address configuration.

10. A method of operating a memory controller, the method comprising:
    receiving a configuration signal into the memory controller, the configuration signal indicating a selected address configuration, and
    processing system addresses based on the selected address configuration to generate memory addresses;
    wherein processing the system addresses to generate the memory addresses comprises selecting bit groups from the system addresses based on the selected address configuration.

11. The method of claim 10, wherein processing the system addresses further comprises selecting row address bits from the system addresses based on a number of column address bits in the selected address configuration.

12. The method of claim 10, wherein processing the system addresses further comprises selecting bank address bits from the system addresses based on a number of column address bits and a number of row address bits in the selected address configuration.

13. The method of claim 10, wherein:
receiving the configuration signal further comprises receiving a configuration signal indicating a selected memory configuration; and
processing systems addresses further comprises processing the system addresses based on the selected memory configuration to generate memory device selections.

14. The method of claim 10, wherein receiving the configuration signal further comprises receiving the configuration signal from outside the memory controller and processing the system addresses further comprises receiving the system addresses from outside the memory controller.

15. A method of operating a memory controller, the method comprising:
receiving a configuration signal into the memory controller indicating a selected address configuration;
processing system addresses based on the selected address configuration to generate memory addresses; and
selecting row address bits from the system addresses based on a number of column address bits in the selected address configuration.

16. The method of claim 15, further comprising selecting bank address bits from the system addresses based on the number of column address bits and a number of row address bits in the selected address configuration.

17. The method of claim 15, wherein the configuration signal also indicates a selected memory configuration and further comprising processing the system addresses based on the selected memory configuration to generate memory device selections.

18. The method of claim 15, further comprising:
receiving system control signals and the system addresses into the memory controller;
generating memory control signals in response to the system control signals;
transferring the memory control signals and the memory addresses from the memory controller; and
receiving data into the memory controller and transferring the data from the memory controller.

19. The method of claim 15, wherein processing the system addresses to generate the memory addresses comprises generating the memory addresses for a dynamic random access memory.

20. A method for making a memory system, the method comprising:
providing a programmable memory controller and memory devices, the programmable memory controller being configured to generate memory addresses from system addresses based on a particular address configuration of the memory devices;
integrating the programmable memory controller and the memory devices together into a circuitry to form a memory system; and
programming the programmable memory controller according to the particular address configuration of the memory devices after integrating the programmable memory controller and the selected memory devices into the circuitry.

21. The method of claim 20, wherein programming the programmable memory controller further comprises:
configuring the programmable memory controller to generate memory device selections from the system addresses based on a particular memory configuration of the memory system.

22. The method of claim 21, further comprising:
receiving a configuration signal that comprises the particular address configuration and the particular memory configuration.

* * * * *